(12) United States Patent
Dunne et al.

(10) Patent No.: US 12,348,677 B1
(45) Date of Patent: Jul. 1, 2025

(54) BIDIRECTIONAL VIDEOCONFERENCE-RELATED MESSAGING FOR PUBLIC SWITCHED TELEPHONE NETWORK PARTICIPANTS

(71) Applicant: Amazon Technologies, Inc., Seattle, WA (US)

(72) Inventors: John Joseph Dunne, Bremertom, WA (US); Siddhartha Shankara Rao, Seattle, WA (US); Michael Mark Goodwin, Scotts Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,336

(22) Filed: Mar. 31, 2022

(51) Int. Cl.
*H04M 3/56* (2006.01)
*H04M 3/42* (2006.01)

(52) U.S. Cl.
CPC ....... *H04M 3/567* (2013.01); *H04M 3/42382* (2013.01); *H04M 2201/50* (2013.01)

(58) Field of Classification Search
CPC ............. H04M 3/567; H04M 3/42382; H04M 2201/50
See application file for complete search history.

(56) References Cited

U.S. PATENT DOCUMENTS

| | | | |
|---|---|---|---|
| 6,501,740 B1 * | 12/2002 | Sun | H04M 7/1205 379/202.01 |
| 10,412,346 B1 | 9/2019 | Yu | |
| 2004/0019629 A1 * | 1/2004 | Cotte | H04M 7/0045 709/204 |
| 2004/0075772 A1 | 4/2004 | Gu et al. | |
| 2004/0128350 A1 | 7/2004 | Topfl et al. | |
| 2004/0199580 A1 * | 10/2004 | Zhakov | H04M 3/563 709/204 |
| 2006/0136828 A1 * | 6/2006 | Asano | G06F 3/1454 715/764 |
| 2009/0123035 A1 | 5/2009 | Khouri et al. | |
| 2011/0033033 A1 | 2/2011 | Koul et al. | |

(Continued)

FOREIGN PATENT DOCUMENTS

CN 101465919 A 6/2009

*Primary Examiner* — Phung-Hoang J Nguyen
(74) *Attorney, Agent, or Firm* — BakerHostetler

(57) ABSTRACT

A videoconference among a plurality of participants may be hosted, wherein the plurality of participants comprise Internet Protocol (IP)-connected participants and a Public Switched Telephone Network (PSTN)-connected participant. The IP-connected participants may send and receive audio content and video content of the videoconference via IP-based connections. The PSTN-connected participant may send and receive the audio content of the videoconference via a PSTN connection. Additional content from the videoconference may also be transmitted to the PSTN-connected participant, for example as text messages via the PSTN connection. The additional content may include, for example, images of a videoconference screen share, chat posts, polls, and the like. Images may be transmitted in the additional content based on video status change events, such as switching slides or pages in a screen share. In some examples, bidirectional messaging may allow contents of text messages from the PSTN-connected user to be displayed in the videoconference.

12 Claims, 8 Drawing Sheets

(56) References Cited

U.S. PATENT DOCUMENTS

| | | | |
|---|---|---|---|
| 2013/0036162 A1* | 2/2013 | Koenigs | H04L 51/56 |
| | | | 382/276 |
| 2013/0163480 A1* | 6/2013 | Dye | H04N 7/15 |
| | | | 370/260 |
| 2016/0100050 A1* | 4/2016 | VanBlon | H04W 4/16 |
| | | | 455/415 |
| 2016/0301653 A1* | 10/2016 | Kirchhoff | H04L 51/043 |
| 2018/0295275 A1* | 10/2018 | Azar | A61B 8/565 |
| 2019/0065442 A1 | 2/2019 | Rommel et al. | |
| 2020/0304851 A1* | 9/2020 | Hou | H04N 21/2668 |
| 2020/0326846 A1 | 10/2020 | Leong et al. | |
| 2021/0097599 A1 | 4/2021 | Sandow | |
| 2022/0264156 A1 | 8/2022 | Lehtiniemi et al. | |

\* cited by examiner

BIDIRECTIONAL VIDEOCONFERENCE-RELATED MESSAGING FOR PUBLIC SWITCHED TELEPHONE NETWORK PARTICIPANTS

CROSS-REFERENCE TO RELATED APPLICATIONS

This application is related to the following application, which is hereby incorporated by reference in its entirety: U.S. patent application Ser. No. 17/710,294 filed Mar. 31, 2022, entitled "VIDEOCONFERENCE CONTENT SHARING FOR PUBLIC SWITCHED TELEPHONE NETWORK PARTICIPANTS".

BACKGROUND

In recent years, videoconferencing has become an increasingly popular tool that allows communication among people at remote locations. The term videoconference, as used herein, refers to a conference among participants, in which at least some of the participants send and receive both audio content and video content of the conference. In some examples, one or more participants may access (e.g., via dial-in) and participate in a videoconference using a telephone via a Public Switched Telephone Network (PSTN) connection. These PSTN-connected participants may send and receive audio content of the videoconference, but they may be unable to send and receive video content of the videoconference. While the PSTN-connected participants may participate in conversation, they may be excluded from other features of the videoconference. For example, in some cases, the PSTN-connected participants may be unable to see other conference participants, and other conference participants may be unable to see them. Additionally, the PSTN-connected participants may be unable to see computer display shares (e.g., screen share, window share) that are provided by other participants. Furthermore, PSTN-connected participants may be excluded from other modalities, such as conference chat, voting in polls, and others.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
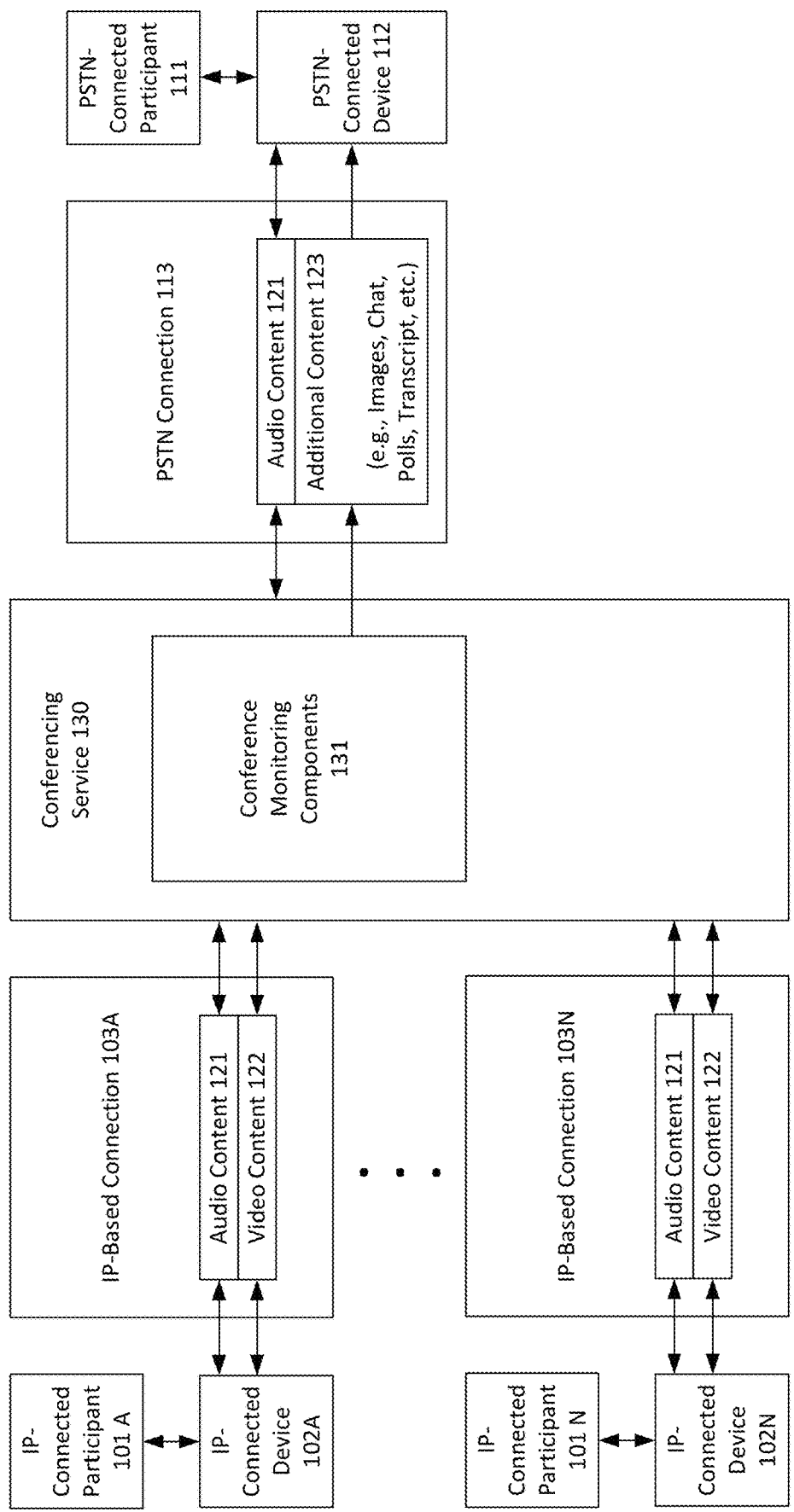
FIG. 1 is a diagram illustrating a first example videoconference content sharing system that may be used in accordance with the present disclosure.

Techniques for videoconference content sharing for Public Switched Telephone Network (PSTN) participants are described herein. As noted above, the term videoconference, as used herein, refers to a conference among participants, in which at least some of the participants send and receive both audio content and video content of the conference. In some examples, a videoconference may have Internet Protocol (IP)-connected participants that are connected to the videoconference via IP-based connections (e.g., via the Internet), for example using videoconferencing applications, Internet browsers, etc. The IP-connected participants send and receive audio content of the videoconference and video content of the videoconference via the IP-based connections. Additionally, the videoconference may also have a PSTN-connected participant that is connected to the videoconference via a PSTN connection, for example on a smartphone. The PSTN-connected participant sends and receives the audio content of the videoconference via the PSTN connection. The techniques described herein may allow additional content from the videoconference (e.g., images, chat, polls, etc.) to be sent to (and optionally received from) the PSTN-connected participant, for example via the PSTN connection, thereby allowing the PSTN-connected participant to more fully participate in the videoconference. In some examples, the additional content may be sent to (and optionally received from) the PSTN-connected participant via one or more text messaging protocols (e.g., Short Messaging Service (SMS), Multimedia Messaging Service (MMS), and the like) and displayed via a text messaging application.

In some examples, the additional content that is sent to the PSTN-connected participants may include images of the videoconference. For example, in some cases, the additional content may include images (e.g., screenshots) of computer display shares (e.g., screen share, window share) that are provided by IP-connected participants. Also, in some examples, the additional content may include images of one or more conference participants. In some examples, the images of the videoconference may be sent only at certain times within the videoconference, such as in response to video status change events. By sending images only at certain times (e.g., in response to video status change events), the system may prevent the PSTN connection from being overwhelmed with image data and may also reduce unnecessary disturbances to the PSTN-connected participant.

In some cases, the conference hosting system may monitor the conference (e.g., the conference video content) to detect video status change events. The video status change events are events that correlate to changes in the conference video content. The video status change events may include, for example, a change that occurs in a computer display share, such as switching between slides in a slide deck, switching between pages in a document, scrolling a document over a threshold amount, switching between windows, switching between scenes in a displayed video, and the like. Also, in some examples, the video status change events may include a conference participant joining or leaving the conference. In some examples, the video status change events may be detected based, at least in part, on pixel-by-pixel techniques, such as by detecting color changes to at least a threshold quantity and/or threshold percentage of pixels in the conference video content. Also, in some examples, the video status change events may be detected using one or more machine learning algorithms.

Furthermore, in some examples, the additional content that is sent to the PSTN-connected participants may include videoconference chat messages, videoconference polls, and the like. Moreover, in some examples, there may be bidirectional communication of additional content between the PSTN-connected participant and other users. For example, in some cases, the PSTN-connected participant may receive videoconference chat messages and/or polls via text messages and may also send text messages (e.g., responsive chat messages, poll responses). In some examples, the text messages sent from the PSTN-connected participant may be received by a conferencing service. The conferencing service may then display contents of the messages in the videoconference chat or elsewhere in the video content of the videoconference.

In some examples, PSTN-connected participants may opt-into, and opt-out of, receiving additional content via telephone-based controls, such as a telephone key combination (e.g., *5). Additionally, in some examples, when a PSTN-connected participant connects and receives the videoconference audio content via a first phone device, the PSTN-connected participant may optionally provide an alternative phone number to receive additional conference data via text messages on an alternative phone device. Moreover, in some examples, a PSTN-connected participant may provide a fax number to receive additional conference data via a fax. In yet other examples, additional conference data may be delivered via non-PSTN modalities, such as email, a chat application and the like, for example via an additional IP-based connection.

Thus, the techniques described herein may allow additional videoconference content (e.g., screen share or other images, chat messages, polls, etc.) to be delivered to PSTN-connected participants in scenarios when the PSTN-connected participants cannot, or choose not to, access an IP-based connection to a videoconference. For example, additional content may be delivered to PSTN-connected participants, via a PSTN connection, in scenarios when their devices do not support IP-based connectivity. Additionally, additional content may be delivered to PSTN-connected participants, via a PSTN connection, in scenarios when an IP-connection may not be capable of supporting streaming video, such as when a PSTN-connected participant is in a remote area with a weak signal or is highly mobile with frequent cellular tower roaming (e.g., a passenger in car, train, etc.). Furthermore, additional content may be delivered to PSTN-connected participants, via a PSTN connection, in scenarios when an IP-connection may not be desirable, such as international travel in which data roaming costs may be prohibitively expensive. Moreover, additional content may be delivered to PSTN-connected participants, via a PSTN connection, in scenarios when an IP-connection may otherwise not be preferable for security or other reasons, such as scenarios in which a camera on a device is removed or broken, scenarios when access to a videoconference streaming application is denied, and the like.

FIG. 1 is a diagram illustrating a first example videoconference content sharing system that may be used in accordance with the present disclosure. As shown in FIG. 1, a videoconference is hosted by a conferencing service 130. The videoconference has Internet Protocol (IP)-connected participants 101A-N (collectively referred to hereinafter as IP-connected participants 101), which are connected to the videoconference via IP-based connections 103A-N, respectively (e.g., via the Internet). The IP-connected participants 101 operate IP-connected devices 102A-N, respectively, which connect to the videoconference. The IP-connected devices 102A-N may include, for example, laptops, desktops, tablets, smartphones, or other computing devices. In some examples, the IP-connected participants 101 may be connected to the videoconference via videoconferencing applications, Internet browsers, or other applications executing on the IP-connected devices 102A-N. The IP-connected devices 102A-N send and receive audio content 121 of the videoconference and video content 122 of the videoconference via the IP-based connections 103A-N, respectively.

As also shown in FIG. 1, the videoconference also has a PSTN-connected participant 111 that is connected to the videoconference via a PSTN connection 113. The PSTN-connected participant 111 operates PSTN-connected device 112, which connects to the videoconference. In some examples, the PSTN-connected device 112 may be a smartphone or other phone-inclusive computing device. The PSTN-connected device 112 sends and receives the audio content 121 of the videoconference via the PSTN connection 113. In the example of FIG. 1, additional content 123 from the videoconference is sent to the PSTN-connected device 112 via the PSTN connection 113, thereby allowing the PSTN-connected participant 111 to more fully participate in the videoconference. In some examples, the additional content 123 may include images, chat, polls and other content from the videoconference. In some examples, the additional content 123 may be sent to the PSTN-connected device 112 via one or more text messaging protocols (e.g., Short Messaging Service (SMS), Multimedia Messaging Service (MMS), and the like). It is noted that, while FIG. 1 shows only PSTN-connected participant 111, any number of other PSTN-connected participants may participate in the videoconference and may also optionally receive additional content 123. Additionally, although not shown in FIG. 1, the additional content 123 may also optionally be delivered to any, or all, of the IP-connected participants 101. In some examples, PSTN-connected participant 111 may opt-into, and opt-out of, receiving additional content 123 via telephone-based controls, such as a telephone key combination (e.g., *5).

In the example of FIG. 1, the additional content 123 is transmitted to the PSTN-connected participant 111 by conference monitoring components 131. The conference monitoring components 131 may monitor the videoconference, for example including monitoring of audio content 121 and/or video content 122, to select the additional content 123 for transmission to the PSTN-connected participant 111. For example, the conference monitoring components 131 may determine various times at which to send images of the videoconference to the PSTN-connected participant 111, may detect polls and chat messages within the videoconference for transmission to the PSTN-connected participant 111, and may otherwise select additional content 123 for transmission to the PSTN-connected participant 111. Some example techniques for selection of the additional content 123 by the conference monitoring components 131 are described in detail below.

In some examples, the additional content 123 that is sent to the PSTN-connected participant 111 may include images of the videoconference. For example, in some cases, the additional content 123 may include images (e.g., screenshots) of computer display shares (e.g., screen share, window share) that are provided by IP-connected participants 101. Also, in some examples, the additional content 123 may include images of one or more conference participants (e.g., IP-connected participants 101). In some examples, the images of the videoconference may be sent only at certain times within the videoconference, such as in response to video status change events. By sending images only at certain times, the conference monitoring components 131 may prevent the PSTN connection 113 from being overwhelmed with image data and may also reduce unnecessary disturbances to the PSTN-connected participant. 111.

Figure 2:
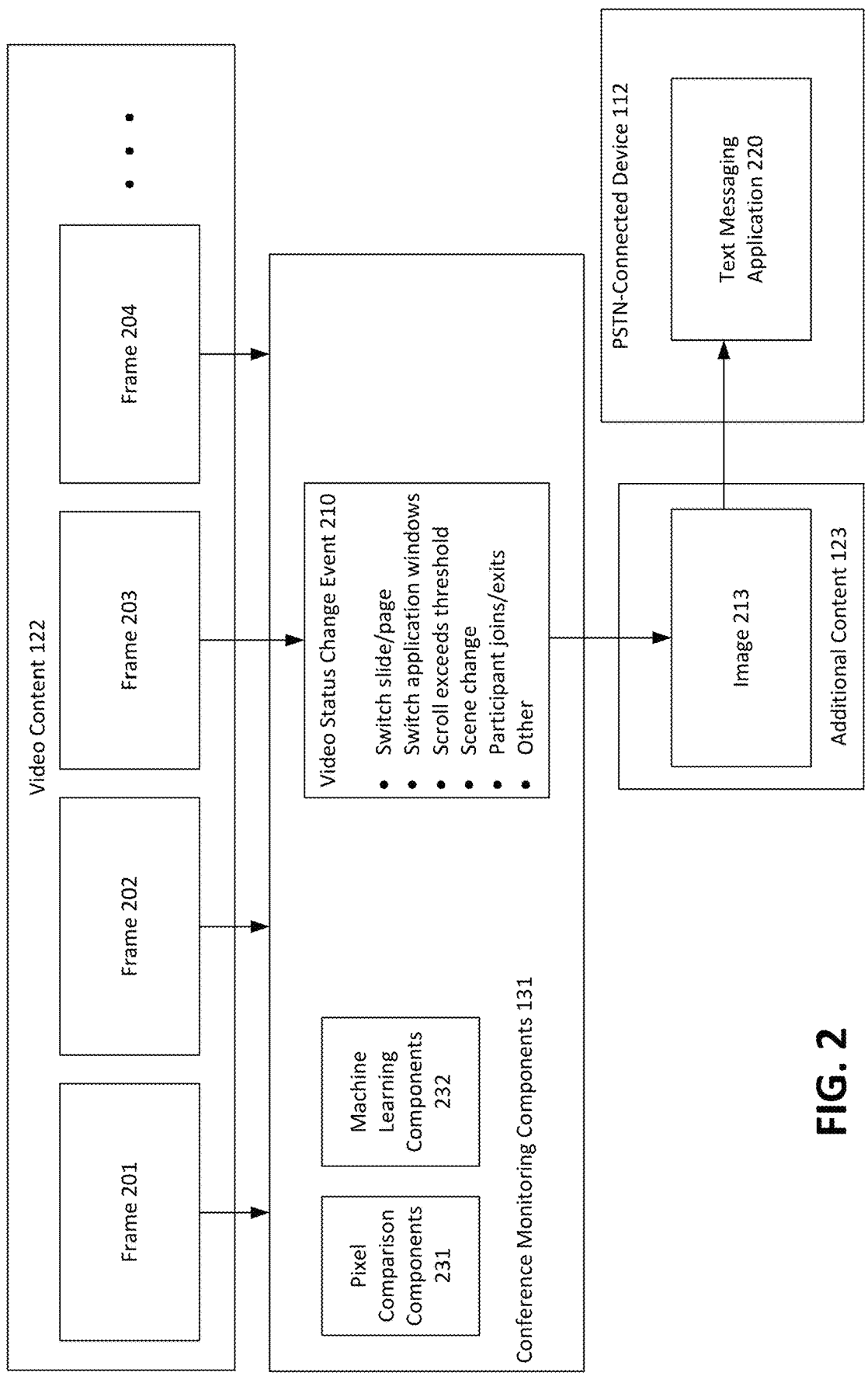
FIG. 2 is a diagram illustrating example videoconference image sharing that may be used in accordance with the present disclosure.

Referring now to FIG. 2, an example in which additional content 123 includes videoconference images will now be described in detail. In the example of FIG. 2, the conference monitoring components 131 monitor the video content 122 of the videoconference to detect a video status change event 210. The video status change event 210 is an event that correlates to a change in the video content 122 of the videoconference. The video status change event 210 may be, for example, a change that occurs in a computer display share (e.g., a screen share or window share), such as switching between slides in a slide deck, switching between pages in a document, switching focus between application windows, scrolling a document over a threshold amount, switching between scenes in a video that is displayed through a screen share or window share, and the like. Also, in some examples, the video status change event 210 may be a conference participant joining or leaving the conference.

In the example of FIG. 2, video content 122 includes frames 201-204 as well as any number of other frames (not shown in FIG. 2). Frames 201-204 are image frames. Conference monitoring components 131 may monitor each of frames 201-204 (as well as other frames of the video content 122) to detect the video status change event 210. In this example, the conference monitoring components 131 detect that the video status change event 210 occurs in frame 203 of the video content 122. As a result of detecting video status change event 210 in frame 203, the conference monitoring components 131 select to send image 213, which includes all, or part, of frame 203, to the PSTN-connected device 112. For example, if the video status change event 210 is a status change to a screen share (e.g., new slide, new page, application window focus switch, etc.), then the image 213 may include all, or a portion, of frame 203 that shows the screen share. As another example, if the video status change event 210 is a participant joining the videoconference, then the image 213 may include all, or a portion, of frame 203 that displays the new participant's face. In the example of FIG. 2, image 213 is transmitted to the PSTN-connected device 112 as a text message, via a text messaging protocol (e.g., MMS) and is displayed on the PSTN-connected device 112 via text messaging application 220.

In some examples, the video status change event 210 may be detected based, at least in part, on pixel-by-pixel techniques, such as by detecting color changes to at least a threshold quantity and/or threshold percentage of pixels in the video content 122. As shown in FIG. 2, conference monitoring components 131 include pixel comparison components 231, which may determine pixel color values for pixels in each of frames 201-204. The pixel comparison components 231 may then compare the pixel color values for a given frame to the pixel color values of one or more other frames, such as an immediately preceding frame. In one specific example, if color values for at least a threshold quantity and/or threshold percentage of pixels in a current frame have changed relative to a preceding frame, then a video status change event 210 may be detected.

Additionally, in some examples, the conference monitoring components 131 may employ one or more text and/or object recognition algorithms to detect objects (e.g., human faces, application windows, slides, pages, lines of text, words, characters, etc.) in the frames 201-204 and to track movement of the objects, and appearance and/or disappearance of the objects. For example, if an object, such as a human face, appears, then this may be an indication that a participant has joined the videoconference. By contrast, if an object, such as a human face, disappears, then this may be an indication that a participant has exited the videoconference. Moreover, appearance and/or disappearance of objects may also be indications of scene changes in a video that is displayed in a screen share or window share. Additionally, appearance and/or disappearance of objects may also be indications of status changes in a screen share or window share, such as switching between slides or pages, scrolling a document, switching between windows, and the like.

As also shown in FIG. 2, conference monitoring components 131 also include machine learning components 232, for example including one or more one or more machine learning algorithms, which may also be employed to detect video status change event 210. In some examples, the machine learning components 232 may include one or more neural network models. In some examples, machine learning components 232 may be trained to detect video status change events. For example, in some cases, the machine learning components 232 may be provided with positive image training sets, which are sets of images from videoconferences in which video status change events are determined to have occurred. The machine learning components 232 may then analyze the characteristics of images both before and after the video status change events were detected. The analyzed characteristics may include, for example, pixel color values, pixel color patterns and locations, detected text and objects (e.g., human faces, application windows, slides, pages, lines of text, etc.) in the images, and the like. The machine learning components 232 may then use these learned positive characteristics to assist in determining when video status change events occur. Also, in some examples, the machine learning components 232 may be provided with negative image training sets, which are sets of images from videoconferences in which video status change events are not determined to have occurred. The machine learning components 232 may then analyze the characteristics of these images. The machine learning components 232 may then use these learned negative characteristics to assist in determining when video status change events do not occur.

Additionally, in some examples, conference monitoring components 131 may monitor other non-video information to determine when a video status change event 210 occurs. For example, in some cases, the conference monitoring components 131 may monitor connections between the conferencing service 130 and the conference participants, such as to determine when a participant has joined, or left, the videoconference. Also, in addition, or as an alternative, to video status change events, images of a videoconference may be transmitted to the PSTN-connected participant 111 based on other events associated with the videoconference, such as timing events, user input events, and the like. For example, in some cases, images may be transmitted at the expiration of a designated time interval, such as every sixty seconds. In other examples, images may be transmitted either at the expiration of a designated time interval or at the occurrence of a video status change event if the video status change event is detected prior to expiration of the designated time interval. In yet other examples, a conference participant, such as the PSTN-connected participant 111 and/or one of the IP-connected participants 101, may manually request that an image of the videoconference be transmitted to PSTN-connected participant 111, for example based on user input such as a telephone, keyboard or other key combination, selection of a control in a conferencing application user interface, a verbal command that may be recognized via speech recognition, and the like.

Figure 3:
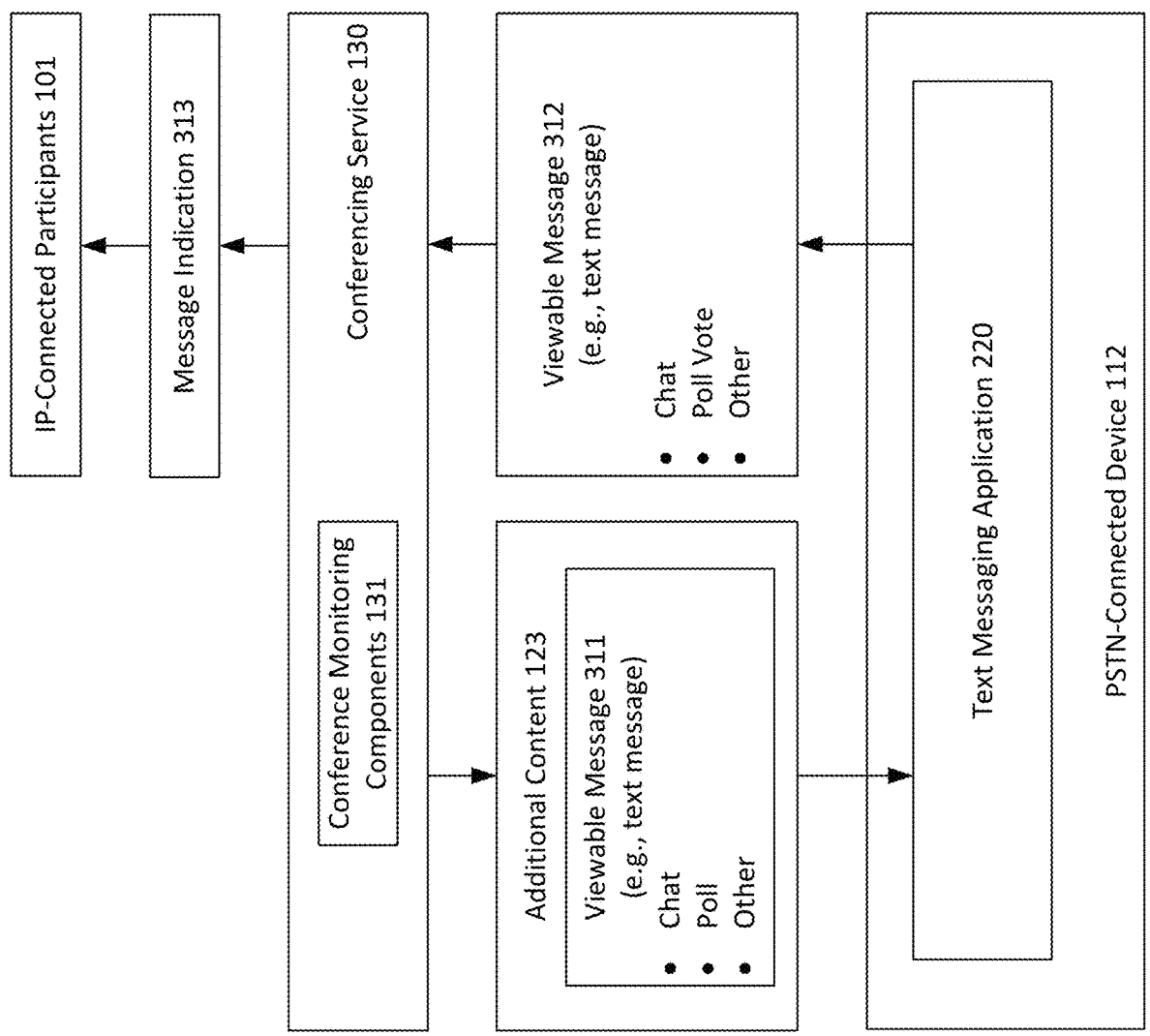
FIG. 3 is a diagram illustrating example bidirectional videoconference-related messaging that may be used in accordance with the present disclosure.

In some examples, the additional content 123 that is sent to the PSTN-connected participant 111 may include videoconference chat messages, videoconference polls, and the like. Moreover, in some examples, there may be bidirectional communication of additional content 123 between the PSTN-connected participant 111 and the IP-connected participants 101. For example, in some cases, the PSTN-connected participant 111 may receive videoconference chat messages and/or polls via text messages and may also send text messages (e.g., responsive chat messages, poll responses). Referring now to FIG. 3, an example of bidirectional videoconference-related messaging will now be described in detail. As shown in FIG. 3, the additional content 123 that is sent to the PSTN-connected participant 111, via PSTN-connected device 112, may include a viewable message 311, such as a text message. The viewable message may include content from the videoconference, such as chat messages that are posted in the videoconference chat, videoconference polls, any of the images described above with reference to FIG. 2, and other content. The viewable message 311 may be generated by the conference monitoring components 131 based on the contents of the videoconference. For example, the conference monitoring components 131 may monitor the videoconference to detect when chat messages are posted in the videoconference, to detect when videoconference polls are issued, and to detect any of the video status change events described above. The conference monitoring components 131 may then generate the viewable message 311 based on the detection of any of these or other events in the videoconference.

In the example of FIG. 3, there is bidirectional messaging with the PSTN-connected participant 111. Thus, in addition to receiving viewable message 311 with videoconference-related content, the PSTN-connected participant 111 may also send a viewable message 312 that includes videoconference-related content. In some examples, viewable message 312 may be a reply to viewable message 311. For example, if viewable message 311 includes a poll, the viewable message 312 may include a poll vote that is responsive to the poll. In other examples, viewable message 312 may include a chat post that is a response to a chat post included in viewable message 311. In other examples, viewable message 311 may be a response to viewable message 312. In yet other examples, viewable messages 311 and 312 may be independent messages that are not directly responsive to one another. In some examples, the viewable message 312 may include text, images, and/or other data.

In this example, viewable message 312 is received by the conferencing service 130. The conferencing service 130 may then generate a message indication 313, which may be provided to the IP-connected participants 101. The message indication 313 is an indication of the viewable message 312. For example, the message indication 313 may include some, or all, of the contents of viewable message 312. In one specific example, the message indication 313 may be in the form of a chat post that is generated and displayed in the videoconference chat, and the generated chat post may include the contents of viewable message 312. Also, in some examples, the message indication 313 may include an indication of a poll vote that was submitted, by the PSTN-connected participant 111, via viewable message 312. In addition, or as an alternative, to the videoconference chat, the message indication 313 may be displayed elsewhere in the videoconference, such as in other locations or fields, in the video content 122. In yet other examples, the message indication 313 may be delivered to the IP-connected participants in other ways, such as via one or more text messages, emails, and/or other communications to the IP-connected participants 101. Moreover, in some examples, in addition, or as an alternative, to the IP-connected participants 101, the message indication 313 may be delivered to other PSTN-connected participants (in addition to PSTN-connected participant 111) that may also optionally be participating in the videoconference. Additionally, in some examples, in addition, or as an alternative, to being sent to conferencing service 130, viewable message 312 may be sent directly from the PSTN-connected device 112 to other conference participants, for example including the IP-connected participants 101 and other additional PSTN-connected participants.

Figure 4:
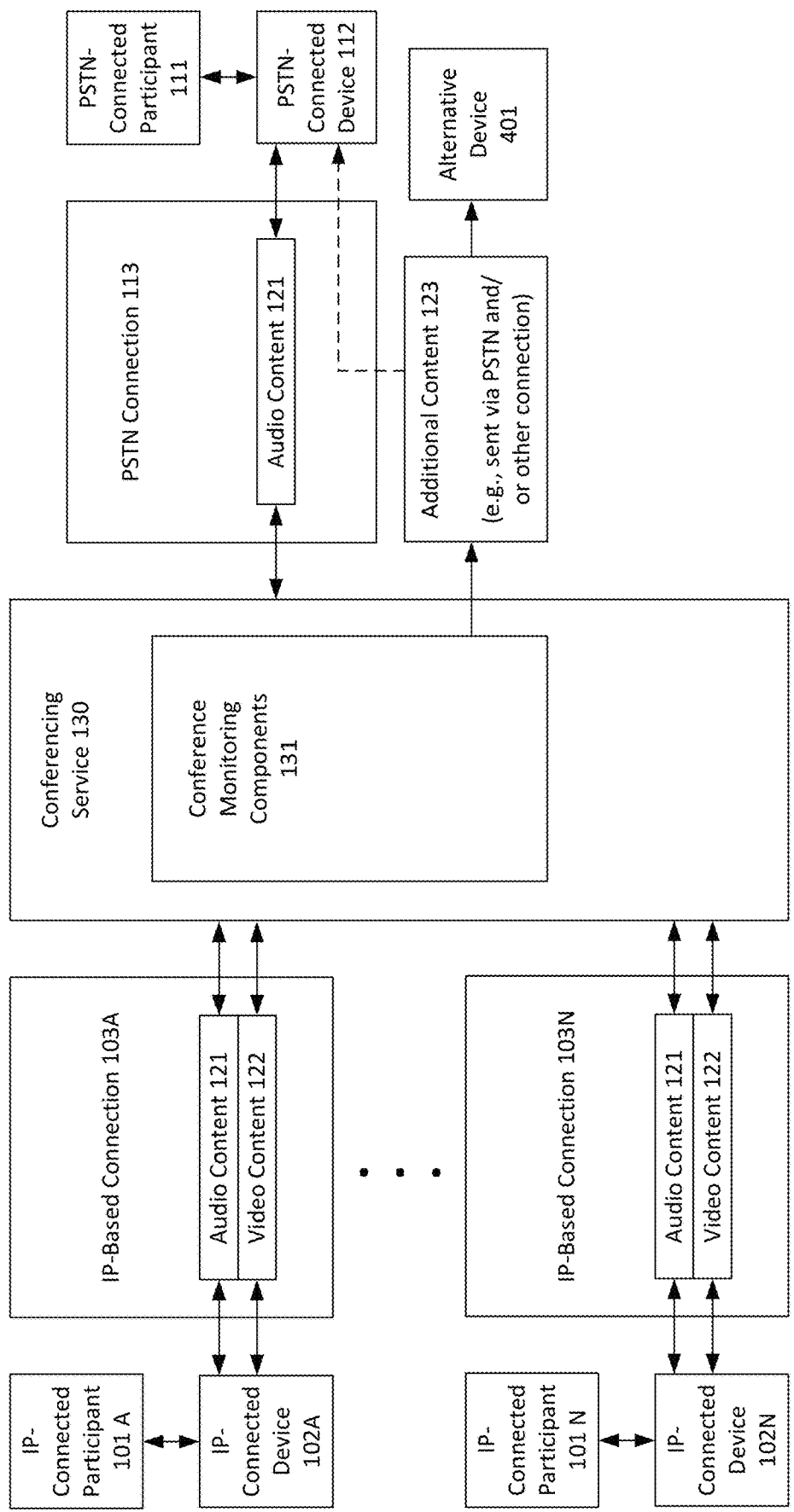
FIG. 4 is a diagram illustrating a second example videoconference content sharing system with an alternative device that may be used in accordance with the present disclosure.

As described above with reference to FIG. 1, additional content 123 may be sent, via PSTN connection 113, to the PSTN-connected device 112 operated by the PSTN-connected participant 111. However, in some other examples, in addition, or as an alternative, to sending the additional content 123 to the PSTN-connected device 112, the additional content 123 may be sent to an alternative device. Referring now to FIG. 4, an example is shown in which the additional content 123 is sent to alternative device 401. In some examples, the alternative device 401 may be a smartphone, and the PSTN-connected participant 111 may provide, to the conferencing service 130, via the PSTN-connected device 112, a phone number for the alternative device 401 at which to receive the additional content 123. Moreover, in some examples, the alternative device 401 may be a fax machine (a telecopier), and the PSTN-connected participant 111 may provide, to the conferencing service 130, via the PSTN-connected device 112, a fax number for the alternative device 401 at which to receive the additional content 123. In yet other examples, the alternative device 401 may be a laptop, desktop, tablet or any other kind of computing device. As should be appreciated, the use of alternative device 401 may allow the PSTN-connected participant 111 to receive the additional content 123 even when the PSTN-connected device 112 that sends and receives audio content 121 of the videoconference is incapable of receiving text messages, such as when the PSTN-connected device 112 is a traditional telephone device that is not a smartphone. In some examples, the additional content 123 may be sent to the alternative device 401 instead of the PSTN-connected device 112. In some other examples, the additional content 123 may be sent to both the alternative device 401 and the PSTN-connected device 112 (as represented by the dashed line from additional content 123 to PSTN-connected device 112).

In some examples, the additional content 123 may be delivered to the alternative device 401 via another PSTN connection (not shown in FIG. 4). Also, in some examples, the additional content 123 may be delivered to the alternative device 401 via an IP-based connection or other type of connection. Moreover, in some examples, the additional content 123 may optionally be delivered to the PSTN-connected device 112 via an IP-based connection or other type of connection (if available and supported by the PSTN-connected device 112). For example, in some cases, additional content 123 may be delivered by non-PSTN modalities, such as email, a chat application and the like.

Figure 5:
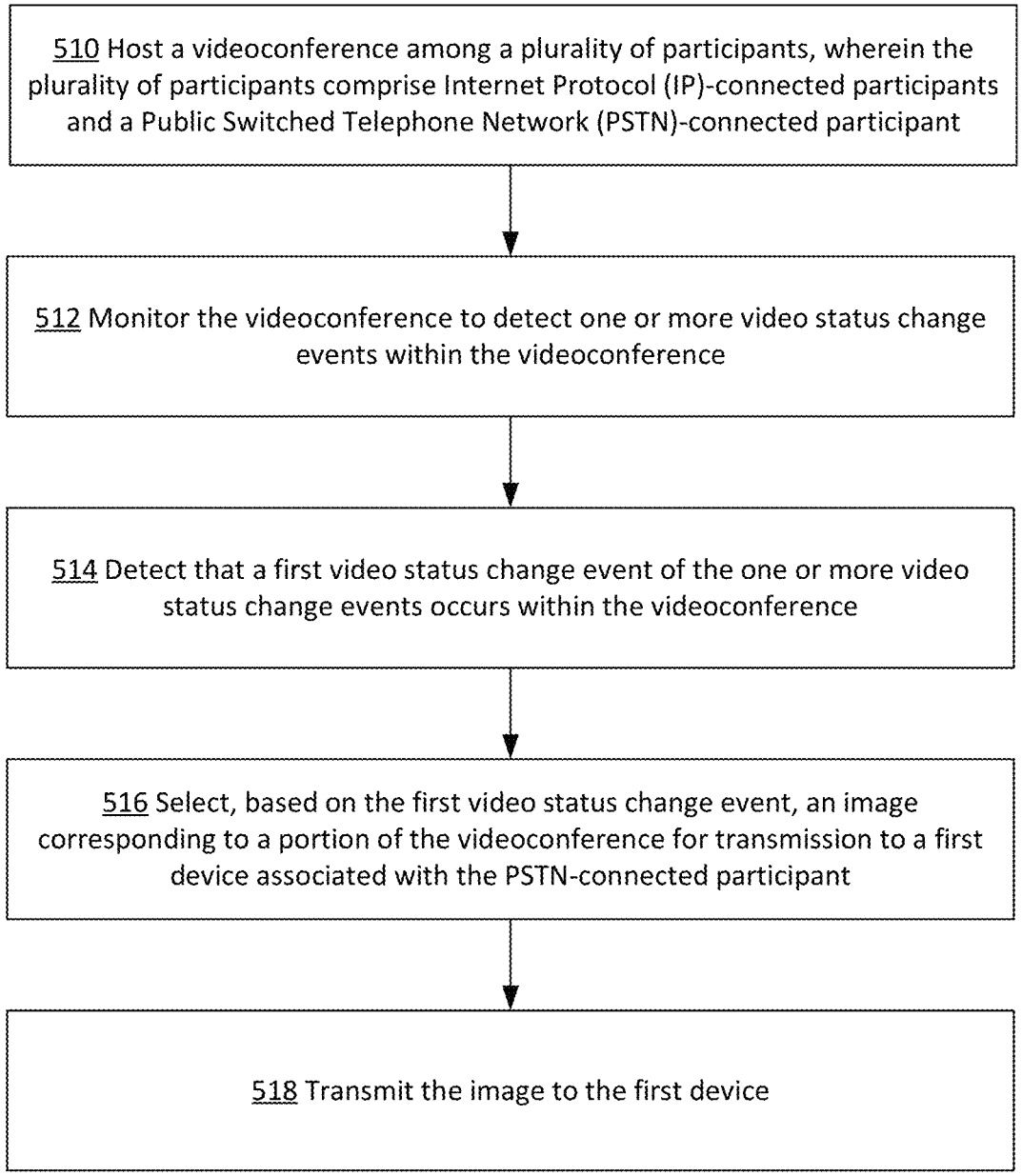
FIG. 5 is a flowchart illustrating an example videoconference image sharing process that may be used in accordance with the present disclosure.

FIG. 5 is a flowchart illustrating an example videoconference image sharing process that may be used in accordance with the present disclosure. In some examples, any, or all, of the operations 510-518 of FIG. 5 may be performed by conferencing service 130 of FIG. 1. At operation 510, a videoconference among a plurality of participants is hosted, wherein the plurality of participants comprise Internet Protocol (IP)-connected participants and a Public Switched Telephone Network (PSTN)-connected participant. As described above, the IP-connected participants are connected to the videoconference via IP-based connections, and the IP-connected participants send and receive audio content of the videoconference and video content of the videoconference via the IP-based connections. As also described above, the PSTN-connected participant is connected to the videoconference via a PSTN connection, and the PSTN-connected participant sends and receives the audio content of the videoconference via the PSTN connection. Hosting of the videoconference, by a conferencing service, may include establishing, and/or facilitating establishment of, connections with the conference participants, such as via a designated uniform resource locator (URL) or other address or location, a phone number, or another resource provided by the conferencing service. Hosting of the videoconference, by a conferencing service, may also include sending and receiving of the video content of the video conference to and from the IP-connected participants, as well as sending and receiving of the audio content of the video conference to and from the IP-connected participants and the PSTN-connected participant.

At operation 512, the videoconference is monitored to detect one or more video status change events within the videoconference. As described above with reference to FIG. 2, the conference monitoring components 131 may monitor the video content 122 of the videoconference to detect a video status change event 210. A video status change event 210 is an event that correlates to a change in the video content 122 of the videoconference. As described above, the monitoring may be performed by evaluating and comparing the contents of video frames, such as by comparing the contents of a current frame to one or more previous frames. In the example of FIG. 2, video content 122 includes frames 201-204 as well as any number of other frames (not shown in FIG. 2). Frames 201-204 are image frames. Conference monitoring components 131 may monitor each of frames 201-204 (as well as other frames of the video content 122) to detect the video status change event 210. In the example of FIG. 2, the conference monitoring components 131 detect that the video status change event 210 occurs in frame 203 of the video content 122. Techniques for detection of video status change events are described above with reference to FIG. 2 and below with respect to operation 514.

At operation 514, it is detected that a first video status change event of the one or more video status change events occurs within the videoconference. In some examples, the first video status change event may be a status change to a computer display share (e.g., screen share, window share). For example, in some cases, the first video status change event may include switching to a slide or page in a computer display share of the video content of the videoconference, such as including displaying of an initial slide or page in a presentation or switching between slides or pages in a presentation. Additionally, in some examples, the first video status change event may include scrolling a document over a threshold amount in a computer display share of the video content of the videoconference. Furthermore, in some examples, the first video status change event may include a scene change of a video that is displayed in a computer display share of the video content of the videoconference. Also, in some examples, the first video status change event may include a switch in focus between application windows displayed in a computer display share of the video content of the videoconference.

As described above with reference to FIG. 2, in some examples, the video status change event 210 may be detected based, at least in part, on pixel-by-pixel techniques, such as by detecting color changes to at least a threshold quantity and/or threshold percentage of pixels in the video content 122. As shown in FIG. 2, conference monitoring components 131 include pixel comparison components 231, which may determine pixel color values for pixels in each of frames 201-204. The pixel comparison components 231 may then compare the pixel color values for a given frame to the pixel color values of one or more other frames, such as an immediately preceding frame. In one specific example, if color values for at least a threshold quantity and/or threshold percentage of pixels in a current frame have changed relative to a preceding frame, then a video status change event 210 may be detected.

Additionally, in some examples, the conference monitoring components 131 may employ one or more text and/or object recognition algorithms to detect objects (e.g., human faces, application windows, slides, pages, lines of text, words, characters, etc.) in the frames 201-204 and to track movement of the objects, and appearance and/or disappearance of the objects.

In some examples, one or more machine learning algorithms may detect occurrence of the first video status change event. As also shown in FIG. 2, conference monitoring components 131 also include machine learning components 232, for example including one or more one or more machine learning algorithms, which may also be employed to detect video status change event 210. In some examples, the machine learning components 232 may include one or more neural network models. In some examples, machine learning components 232 may be trained to detect video status change events. For example, in some cases, the machine learning components 232 may be provided with positive image training sets, which are sets of images from videoconferences in which video status change events are determined to have occurred. The machine learning components 232 may then analyze the characteristics of images both before and after the video status change events were detected. The analyzed characteristics may include, for example, pixel color values, pixel color patterns and locations, detected text and objects (e.g., human faces, application windows, slides, pages, lines of text, etc.) in the images, and the like. The machine learning components 232 may then use these learned positive characteristics to assist in determining when video status change events occur. Also, in some examples, the machine learning components 232 may be provided with negative image training sets, which are sets of images from videoconferences in which video status change events are not determined to have occurred. The machine learning components 232 may then analyze the characteristics of these images. The machine learning components 232 may then use these learned negative characteristics to assist in determining when video status change events do not occur.

Additionally, in some examples, the first video status change event may include one of the plurality of participants joining, or leaving, the videoconference. A participant joining, or leaving, the videoconference conference may be considered a video status change event at least because the video content of the videoconference may be modified to start to include video of a joining participant or to cease to include video of a leaving participant. For example, the conference monitoring components 131 may monitor connections between the conferencing service 130 and the conference participants, such as to detect when a participant has joined, or left, the videoconference. In other examples, a joining or leaving participant may be detected based on a detection of a new and additional participant face in the video content (for a joining participant) or a detection of a subtraction of an existing participant face from the video content (for a leaving participant).

At operation 516, an image corresponding to a portion of the videoconference is selected for transmission to a first device associated with the PSTN-connected participant. The selecting of the image may be performed based on the first video status change event detected at operation 514. For example, as described above with reference to FIG. 2, as a result of detecting video status change event 210 in frame 203, the conference monitoring components 131 select to send image 213, which includes all, or part, of frame 203, to the PSTN-connected device 112. If the video status change event 210 is an event occurring within a screen share (e.g., new slide, new page, application window switch, new scene in displayed video, etc.) or other computer display share, then the image 213 may include all, or a portion, of frame 203 that shows the screen share or other computer display share. As another example, if the video status change event 210 is a participant joining the videoconference, then the image 213 may include all, or a portion, of frame 203 that displays the new participant's face.

The first device to which the image is transmitted may be used by the PSTN-connected participant to send and receive the audio content of the videoconference. For example, as shown in FIG. 1, additional content 123, which may include the transmitted image, may be transmitted to PSTN-connected device 112, which sends and receives the audio content 121 of the videoconference. Also, in some examples, the first device may be different from a second device used by the PSTN-connected participant to send and receive the audio content of the videoconference. For example, as shown in FIG. 4, the additional content 123, which may include the transmitted image, may be transmitted to alternative device 401, which is different from the PSTN-connected device 112 that sends and receives the audio content 121 of the videoconference. For example, in some cases, the first device may be a fax machine. As described above, the alternative device 401 may be a fax machine (a telecopier), and the PSTN-connected participant 111 may provide, to the conferencing service 130, via the PSTN-connected device 112, a fax number for the alternative device 401 at which to receive the additional content 123. In yet other examples, the alternative device 401 may be an alternative phone, laptop, desktop, tablet or any other kind of computing device.

At operation 518, the image is transmitted to the first device. In some examples, the image may be transmitted via the PSTN connection. For example, as shown in FIG. 1, the additional content 123, which may include the transmitted image, may be transmitted to PSTN-connected device 112 via PSTN connection 113. As shown in FIG. 4, the image may also optionally be transmitted to alternative device 401 (and/or the PSTN-connected device 112) via a PSTN connection or another type of connection (e.g., an IP-based connection). The image may be transmitted via a text messaging protocol. For example, as shown in FIG. 2, image 213 is transmitted to the PSTN-connected device 112 as a text message, via a text messaging protocol (e.g., MMS) and is displayed on the PSTN-connected device 112 via text messaging application 220.

Figure 6:
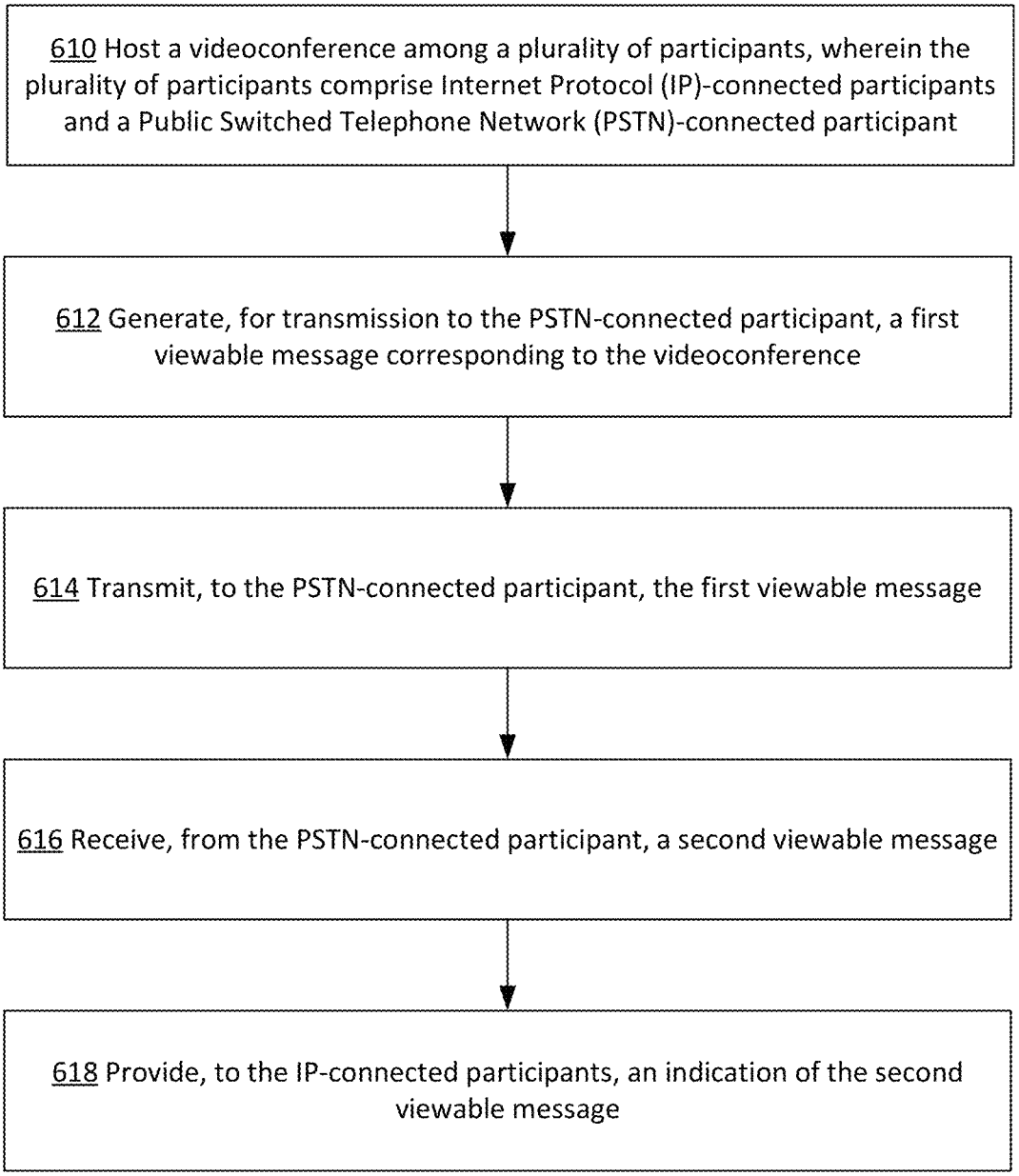
FIG. 6 is a flowchart illustrating an example bidirectional videoconference-related messaging process that may be used in accordance with the present disclosure.

FIG. 6 is a flowchart illustrating an example bidirectional videoconference-related messaging process that may be used in accordance with the present disclosure. In some examples, any, or all, of the operations 610-618 of FIG. 6 may be performed by conferencing service 130 of FIG. 1. At operation 610, a videoconference among a plurality of participants is hosted, wherein the plurality of participants comprise Internet Protocol (IP)-connected participants and a Public Switched Telephone Network (PSTN)-connected participant. As described above, the IP-connected participants are connected to the videoconference via IP-based connections, and the IP-connected participants send and receive audio content of the videoconference and video content of the videoconference via the IP-based connections. As also described above, the PSTN-connected participant is connected to the videoconference via a PSTN connection, and the PSTN-connected participant sends and receives the audio content of the videoconference via the PSTN connection. Hosting of the videoconference, by a conferencing service, may include establishing, and/or facilitating establishment of, connections with the conference participants, such as via a designated uniform resource locator (URL) or other address or location, a phone number, or another resource provided by the conferencing service. Hosting of the videoconference, by a conferencing service, may also include sending and receiving of the video content of the video conference to and from the IP-connected participants, as well as sending and receiving of the audio content of the video conference to and from the IP-connected participants and the PSTN-connected participant.

At operation 612, a first viewable message corresponding to the videoconference is generated for transmission to the PSTN-connected participant. As described above, the first viewable message may be a text message. The first viewable message may include data displayed within the videoconference, such as chat posts, polls, computer display share (e.g., screen share, window share) images, and the like. In some examples, the first viewable message may include text from a chat message within the videoconference. In some examples, the first viewable message may include a poll from the videoconference. In some examples, the first viewable message may include images corresponding to a portion of the videoconference, such as described above with reference to FIG. 2. The viewable message 311 may be generated by the conference monitoring components 131 based on the contents of the videoconference. For example, the conference monitoring components 131 may monitor the videoconference to detect when chat messages are posted in the videoconference change, to detect when videoconference polls are issued, and to detect any of the video status change events described above. The conference monitoring components 131 may then generate the viewable message 311 based on the detection of any of these or other events in the videoconference. In some examples, the PSTN-connected participant may opt-in to receive viewable messages corresponding to the videoconference via a telephone key combination or other command.

At operation 614, the first viewable message is transmitted, to the PSTN-connected participant. In some examples, the first viewable message may be transmitted via the PSTN connection. For example, as shown in FIG. 1, the additional content 123, which may include the first viewable message, is transmitted to the PSTN-connected device 112 via PSTN connection 113. In some examples, such as shown in FIG. 4, the additional content 123, which may include the first viewable message, may be transmitted to an alternative device 401, such as an alternative smartphone, fax machine, or other computing device. In some examples, the first viewable message may be transmitted via an IP-based or other type of connection.

At operation 616, a second viewable message is received from the PSTN-connected participant. As described above, the second viewable message may be a text message. The second viewable message may be a response to the first viewable message. In some examples, the second viewable message may a response to a chat message, such as a chat message included in the first viewable message. In some examples, the second viewable message may include a poll vote from the PSTN-connected participant, such as for a videoconference poll that was included in the first viewable message. As described above, in the example of FIG. 3, there is bidirectional messaging with the PSTN-connected participant 111. Thus, in addition to receiving viewable message 311 with videoconference-related content, the PSTN-connected participant 111 may also send a viewable message 312 that includes videoconference-related content. In some examples, viewable message 312 may be a reply to viewable message 311. For example, if viewable message 311 includes a poll, the viewable message 312 may include a poll vote that is responsive to the poll. In other examples, viewable message 312 may include a chat post that is a response to a chat post included in viewable message 311. In other examples, viewable message 311 may be a response to viewable message 312. In yet other examples, viewable messages 311 and 312 may be independent messages that are not directly responsive to one another. In some examples, the viewable message 312 may include text, images, and/or other data. In some examples, the second viewable message may be received via the PSTN connection. In some examples the second viewable message may be received via an IP-based or other type of connection. In some examples, the second viewable message may be received from PSTN-connected device 112 or from alternative device 401.

At operation 618, an indication of the second viewable message is provided to the IP-connected participants. In some examples, the indication of the second viewable message may be provided, via the videoconference, to the IP-connected participants. For example, in some cases, the indication of the second viewable message may be displayed in the videoconference chat. As described above with reference to FIG. 3, the viewable message 312 is received by the conferencing service 130. The conferencing service 130 may then generate a message indication 313, which may be provided to the IP-connected participants 101. The message indication 313 is an indication of the viewable message 312. For example, the message indication 313 may include some, or all, of the contents of viewable message 312. In one specific example, the message indication 313 may be in the form of a chat post that is generated and displayed in the videoconference chat, and the generated chat post may include the contents of viewable message 312. For example, the second viewable message may include text, and the text may be added to a chat post attributed to the PSTN-connected participant within the videoconference chat. Also, in some examples, the message indication 313 may include an indication of a poll vote that was submitted, by the PSTN-connected participant 111, via viewable message 312. In addition, or as an alternative, to the videoconference chat, the message indication 313 may be displayed elsewhere in the videoconference, such as in other locations or fields, in the video content 122.

Figure 7:
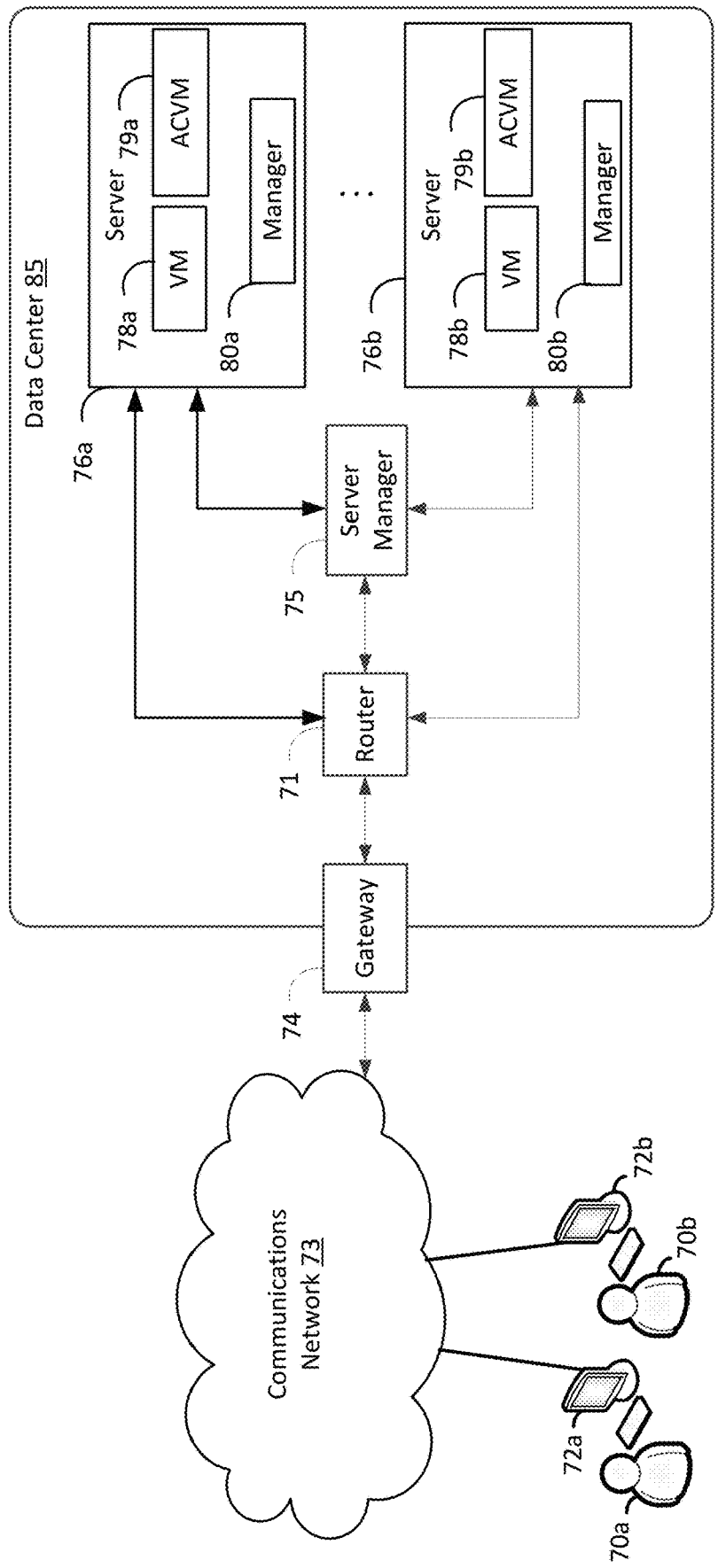
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include additional content virtual machines (ACVM's) 79a-b, which are virtual machines that are configured to execute any, or all, of the videoconference additional content transmission techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
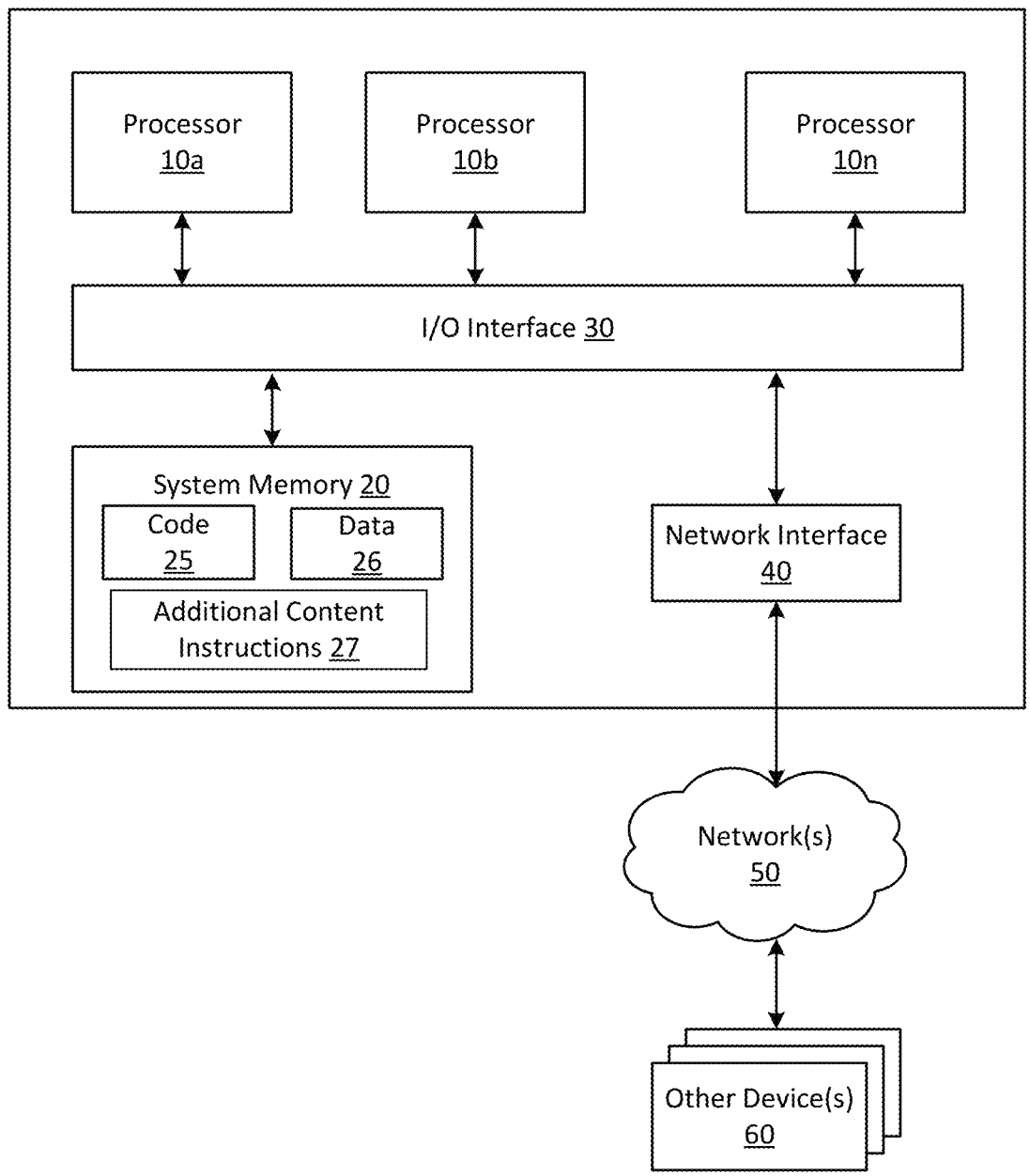
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes additional content instructions 27, which are instructions for executing any, or all, of the videoconference additional content transmission techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system to perform computing operations comprising:
   hosting, by a conferencing service, a videoconference among a plurality of participants, wherein the plurality of participants comprise Internet Protocol (IP)-connected participants and a Public Switched Telephone Network (PSTN)-connected participant, wherein the IP-connected participants are connected to the videoconference via IP-based connections, wherein the IP-connected participants send and receive audio content of the videoconference and video content of the videoconference via the IP-based connections, wherein the PSTN-connected participant is connected to the videoconference via a PSTN connection, wherein the PSTN-connected participant sends and receives the audio content of the videoconference via the PSTN connection;
   generating, by the conferencing service, for transmission to the PSTN-connected participant, a first text message comprising first text from a first chat post within a videoconference chat;
   transmitting, by the conferencing service, to the PSTN-connected participant, via the PSTN connection, the first text message;
   receiving, by the conferencing service, from the PSTN-connected participant, via the PSTN connection, a second text message that is a response to the first text message; and
   providing, by the conferencing service, to the IP-connected participants, via the videoconference chat, at least part of contents of the second text message obtained from the PSTN-connected participant via the PSTN connection, wherein second text from the second text message is added to a second chat post attributed to the PSTN-connected participant within the videoconference chat.

2. The computing system of claim 1, wherein the first text message further comprises a poll from the videoconference.

3. The computing system of claim 2, wherein the second text message comprises a poll vote from the PSTN-connected participant.

4. A computer-implemented method comprising:
   hosting, by a conferencing service, a videoconference among a plurality of participants, wherein the plurality of participants comprise Internet Protocol (IP)-connected participants and a Public Switched Telephone Network (PSTN)-connected participant, wherein the IP-connected participants are connected to the videoconference via IP-based connections, wherein the IP-connected participants send and receive audio content of the videoconference and video content of the videoconference via the IP-based connections, wherein the PSTN-connected participant is connected to the videoconference via a PSTN connection, wherein the PSTN-connected participant sends and receives the audio content of the videoconference via the PSTN connection;
   generating, by the conferencing service, for transmission to the PSTN-connected participant, a first text message comprising first text from a first chat post within a videoconference chat;
   transmitting, by the conferencing service, to the PSTN-connected participant, via the PSTN connection, the first text message;
   receiving, by the conferencing service, from the PSTN-connected participant, via the PSTN connection, a second text message that is a response to the first text message; and
   providing, by the conferencing service, to the IP-connected participants, via the videoconference chat, at least part of contents of the second text message obtained from the PSTN-connected participant via the PSTN connection, wherein second text from the second text message is added to a second chat post attributed to the PSTN-connected participant within the videoconference chat.

5. The computer-implemented method of claim 4, wherein the first text message further comprises a poll from the videoconference.

6. The computer-implemented method of claim 5, wherein the second text message comprises a poll vote from the PSTN-connected participant.

7. The computer-implemented method of claim 4, wherein the PSTN-connected participant opts-in to receive text messages corresponding to the videoconference via a telephone key combination.

8. One or more non-transitory computer-readable storage media having stored thereon computing instructions that, upon execution by one or more computing devices, cause the one or more computing devices to perform computing operations comprising:

hosting, by a conferencing service, a videoconference among a plurality of participants, wherein the plurality of participants comprise Internet Protocol (IP)-connected participants and a Public Switched Telephone Network (PSTN)-connected participant, wherein the IP-connected participants are connected to the videoconference via IP-based connections, wherein the IP-connected participants send and receive audio content of the videoconference and video content of the videoconference via the IP-based connections, wherein the PSTN-connected participant is connected to the videoconference via a PSTN connection, wherein the PSTN-connected participant sends and receives the audio content of the videoconference via the PSTN connection;

generating, by the conferencing service, for transmission to the PSTN-connected participant, a first text message comprising first text from a first chat post within a videoconference chat;

transmitting, by the conferencing service, to the PSTN-connected participant, via the PSTN connection, the first text message;

receiving, by the conferencing service, from the PSTN-connected participant, via the PSTN connection, a second text message that is a response to the first text message; and providing, by the conferencing service, to the IP-connected participants, via the videoconference chat, at least part of contents of the second text message obtained from the PSTN-connected participant via the PSTN connection, wherein second text from the second text message is added to a second chat post attributed to the PSTN-connected participant within the videoconference chat.

9. The one or more non-transitory computer-readable storage media of claim 8, wherein the PSTN-connected participant opts-in to receive text messages corresponding to the videoconference via a telephone key combination.

10. The computing system of claim 1, wherein the PSTN-connected participant opts-in to receive text messages corresponding to the videoconference via a telephone key combination.

11. The one or more non-transitory computer-readable storage media of claim 8, wherein the first text message further comprises a poll from the videoconference.

12. The one or more non-transitory computer-readable storage media of claim 8, wherein the second text message comprises a poll vote from the PSTN-connected participant.

* * * * *